US012658076B2

(12) United States Patent
Gonzalez

(10) Patent No.: US 12,658,076 B2
(45) Date of Patent: Jun. 16, 2026

(54) HEIGHT ADJUSTABLE SIGN HOLDER

(71) Applicant: SPG International, LLC, Atlanta, GA (US)

(72) Inventor: Arturo Gonzalez, Lilburn, GA (US)

(73) Assignee: SPG International, LLC, Atlanta, GA (US)

( * ) Notice: Subject to any disclaimer, the term of this patent is extended or adjusted under 35 U.S.C. 154(b) by 0 days.

(21) Appl. No.: 18/974,206

(22) Filed: Dec. 9, 2024

(65) Prior Publication Data

US 2025/0174159 A1 May 29, 2025

Related U.S. Application Data

(60) Continuation of application No. 18/233,182, filed on Aug. 11, 2023, now Pat. No. 12,165,546, which is a
(Continued)

(51) Int. Cl.
*G09F 7/20* (2006.01)
*A47B 57/00* (2006.01)
(Continued)

(52) U.S. Cl.
CPC .............. *G09F 7/205* (2021.05); *A47B 57/00* (2013.01); *A47B 57/06* (2013.01); *A47B 96/06* (2013.01);
(Continued)

(58) Field of Classification Search
CPC ......... A47B 96/07; A47B 57/00; A47B 57/06; A47B 96/06; A47B 96/1416;
(Continued)

(56) References Cited

U.S. PATENT DOCUMENTS

| | | | |
|---|---|---|---|
| 2,208,237 | A | 7/1940 | Williams et al. |
| 3,912,085 | A | 10/1975 | Cooke et al. |

(Continued)

FOREIGN PATENT DOCUMENTS

| | | | |
|---|---|---|---|
| FR | 2682795 | A3 | 4/1993 |
| JP | H0937899 | A | 2/1997 |
| JP | 2019083972 | A | 6/2019 |

OTHER PUBLICATIONS

International Search Report and Written Opinion for Application No. PCT/US2018/037622 dated Sep. 7, 2018 (8 pages).

*Primary Examiner* — Ko H Chan
(74) *Attorney, Agent, or Firm* — Arnall Golden Gregory LLP

(57) ABSTRACT

A sign holder assembly for a shelving system, in which the shelving system includes a first support post and a second support post, with each support post configured to support a side of a shelf, includes a cross member configured to be coupled to and extend between the first support post and second support post. The assembly further includes a support bracket having a base member configured to be positioned about a portion of the cross member in one of a plurality of positions along a length of the cross member, an extension portion extending from the base member, and a securement member projecting from the extension portion and spaced from the base member.

15 Claims, 14 Drawing Sheets

Related U.S. Application Data division of application No. 16/620,721, filed as application No. PCT/US2018/037622 on Jun. 14, 2018, now Pat. No. 11,783,732.

(60) Provisional application No. 62/535,714, filed on Jul. 21, 2017, provisional application No. 62/519,812, filed on Jun. 14, 2017.

(51) Int. Cl.

| | |
|---|---|
| ***A47B 57/06*** | (2006.01) |
| ***A47B 96/06*** | (2006.01) |
| ***A47B 96/07*** | (2006.01) |
| ***A47B 96/14*** | (2006.01) |
| ***G09F 7/18*** | (2006.01) |
| ***G09F 23/06*** | (2006.01) |
| *A47F 5/08* | (2006.01) |

(52) U.S. Cl.

CPC .......... *A47B 96/07* (2013.01); *A47B 96/1416* (2013.01); *G09F 7/18* (2013.01); *G09F 23/06* (2013.01); *A47B 2220/0036* (2013.01); *A47F 5/08* (2013.01); *A47F 5/0853* (2013.01); *G09F 2007/1834* (2013.01); *G09F 2007/1856* (2013.01)

(58) Field of Classification Search

CPC ..... A47B 2220/0036; G09F 7/18; G09F 7/20; G09F 23/06; G09F 2007/1834; G09F 2007/1856; G09F 3/204; G09F 3/18; G09F 3/20; A47F 5/08; A47F 5/0853

See application file for complete search history.

(56) References Cited

U.S. PATENT DOCUMENTS

| | | | | |
|---|---|---|---|---|
| 4,106,679 | A * | 8/1978 | Hillinger | A45F 5/00<br>224/197 |
| 4,372,468 | A * | 2/1983 | Harvey | A45F 5/021<br>224/904 |
| 4,677,780 | A | 7/1987 | Shuman | |
| 4,706,820 | A | 11/1987 | Spamer et al. | |
| 4,709,891 | A | 12/1987 | Barnett | |
| 4,736,997 | A | 4/1988 | Besore et al. | |
| 4,923,260 | A | 5/1990 | Poulsen | |
| 5,169,010 | A | 12/1992 | Fortner | |
| 5,228,764 | A | 7/1993 | Cherry et al. | |
| 5,664,749 | A | 9/1997 | Kump et al. | |
| 5,727,646 | A * | 3/1998 | Gray | E04D 15/00<br>248/237 |
| D419,699 | S * | 1/2000 | Stodola | D25/199 |
| 6,045,101 | A | 4/2000 | Goyette et al. | |
| 6,102,264 | A * | 8/2000 | Redzisz | B25H 3/006<br>224/904 |
| 7,219,459 | B2 | 5/2007 | Valiulis et al. | |
| 7,270,385 | B2 | 9/2007 | Mathur et al. | |
| 7,494,019 | B2 | 2/2009 | Kessell et al. | |
| 7,568,583 | B2 | 8/2009 | Wing et al. | |
| 7,665,617 | B2 | 2/2010 | Shea | |
| 8,967,402 | B2 | 3/2015 | Pintur | |
| 8,967,405 | B2 | 3/2015 | Pintur | |
| 9,003,715 | B2 * | 4/2015 | Nurdogan | E04D 1/30<br>52/749.12 |
| 9,468,312 | B2 | 10/2016 | Denby | |
| 9,476,544 | B2 | 10/2016 | White | |
| 9,671,063 | B2 | 6/2017 | Mason | |
| 10,134,308 | B2 | 11/2018 | Logan et al. | |
| 10,918,226 | B1 | 2/2021 | Santarelli | |
| 2014/0259831 | A1 | 9/2014 | Denby et al. | |
| 2018/0153316 | A1 | 6/2018 | Buck et al. | |

* cited by examiner

HEIGHT ADJUSTABLE SIGN HOLDER

CROSS-REFERENCE TO RELATED APPLICATIONS

This application is a continuation of U.S. patent application Ser. No. 18/233,182 filed Aug. 11, 2023, which is a divisional of U.S. patent application Ser. No. 16/620,721 filed Dec. 9, 2019, granted as U.S. Pat. No. 11,783,732, which is a National Phase application of PCT Patent Application No. PCT/US2018/037622 filed Jun. 14, 2018, which claims priority to U.S. Provisional Patent Application No. 62/535,714 filed Jul. 21, 2017 and to U.S. Provisional Patent Application No. 62/519,812 filed Jun. 14, 2017, the contents of each of which are incorporated herein in their entirety by reference.

BACKGROUND

The present disclosure relates to a height adjustable sign holder, and more particularly to a sign holder for a modular shelving assembly.

SUMMARY

A sign holder assembly for a shelving system, in which the shelving system includes a first support post and a second support post, with each support post configured to support a side of a shelf, includes a cross member configured to be coupled to and extend between the first support post and second support post. The assembly further includes a support bracket having a base member configured to be positioned about a portion of the cross member in one of a plurality of positions along a length of the cross member, an extension portion extending from the base member, and a securement member projecting from the extension portion and spaced from the base member.

A bracket assembly for supporting a sign on a shelving system, in which the shelving system has first and second support posts configured to support a shelf, includes an elongated cross member configured to be coupled to, and extend between, the first and second support posts. The bracket assembly further includes a bracket having a first section coupled to the cross member along a length of the cross member, a second section extending from the first section, and a third section formed as a lip projecting from the second section.

A sign bracket assembly for a shelving system, in which the shelving system includes a first support post and a second support post each configured to support a side of a shelf, includes an elongated member configured to be coupled to and extend between the first support post and the second support post. The sign bracket assembly also includes a support bracket having a base member configured to be coupled to the elongated member. The base member is configured to fit over an edge of the elongated member. An extension portion extends from and above the base member and is configured such that in an assembled state of the shelving system with the elongated member coupled to the first and second support posts and the base member positioned on the elongated member, the extension portion abuts a rear surface of the shelf. A securement member is configured to be coupled to the extension portion. In an assembled state of the shelving system with the elongated member coupled to the first and second support posts and the base member coupled to the elongated member, the securement member is configured to secure a display to the shelving system.

Other features and aspects of the disclosed embodiments will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
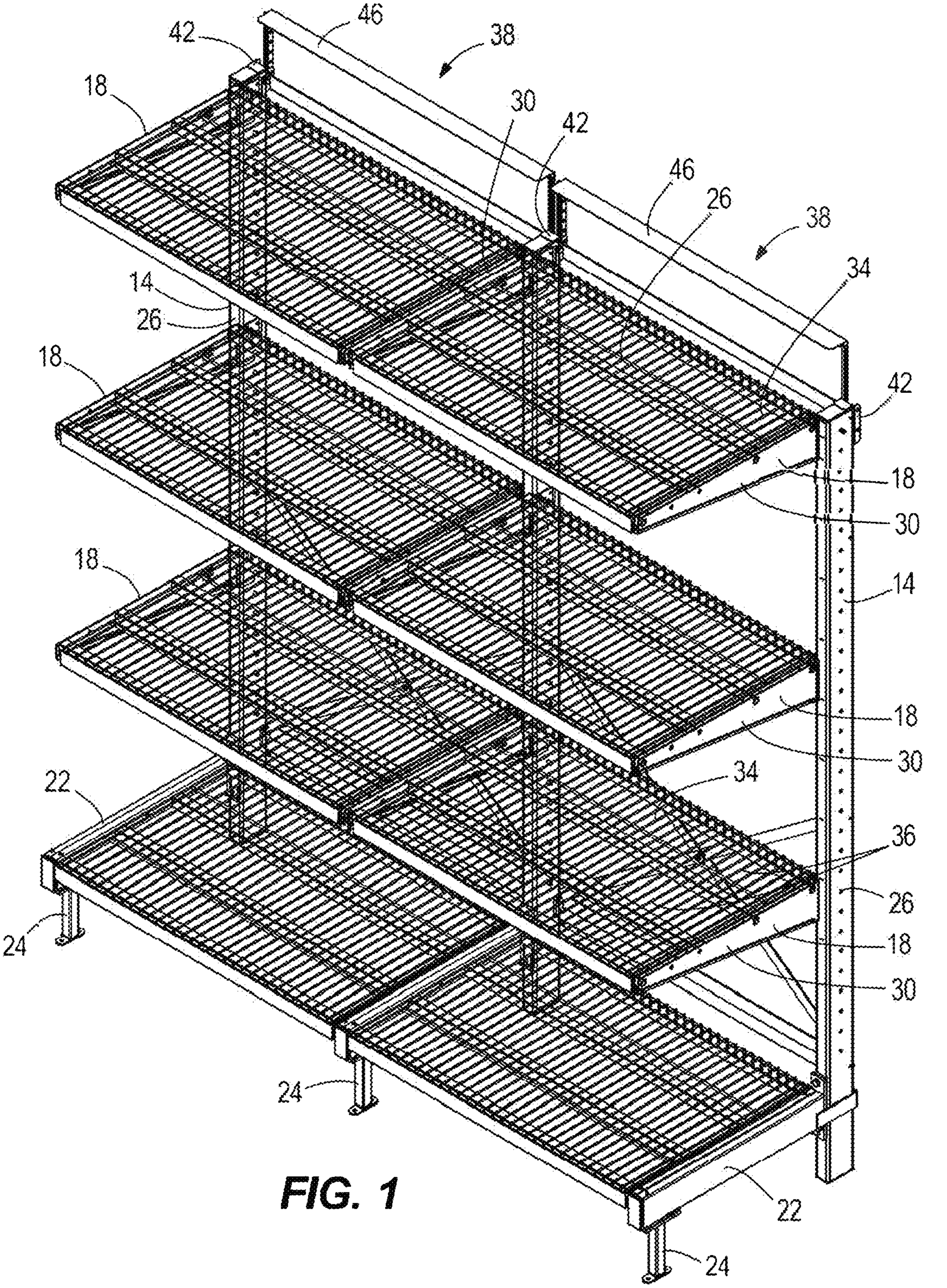
FIG. 1 is a perspective view of a modular shelving assembly including a sign holder.
Figure 2:
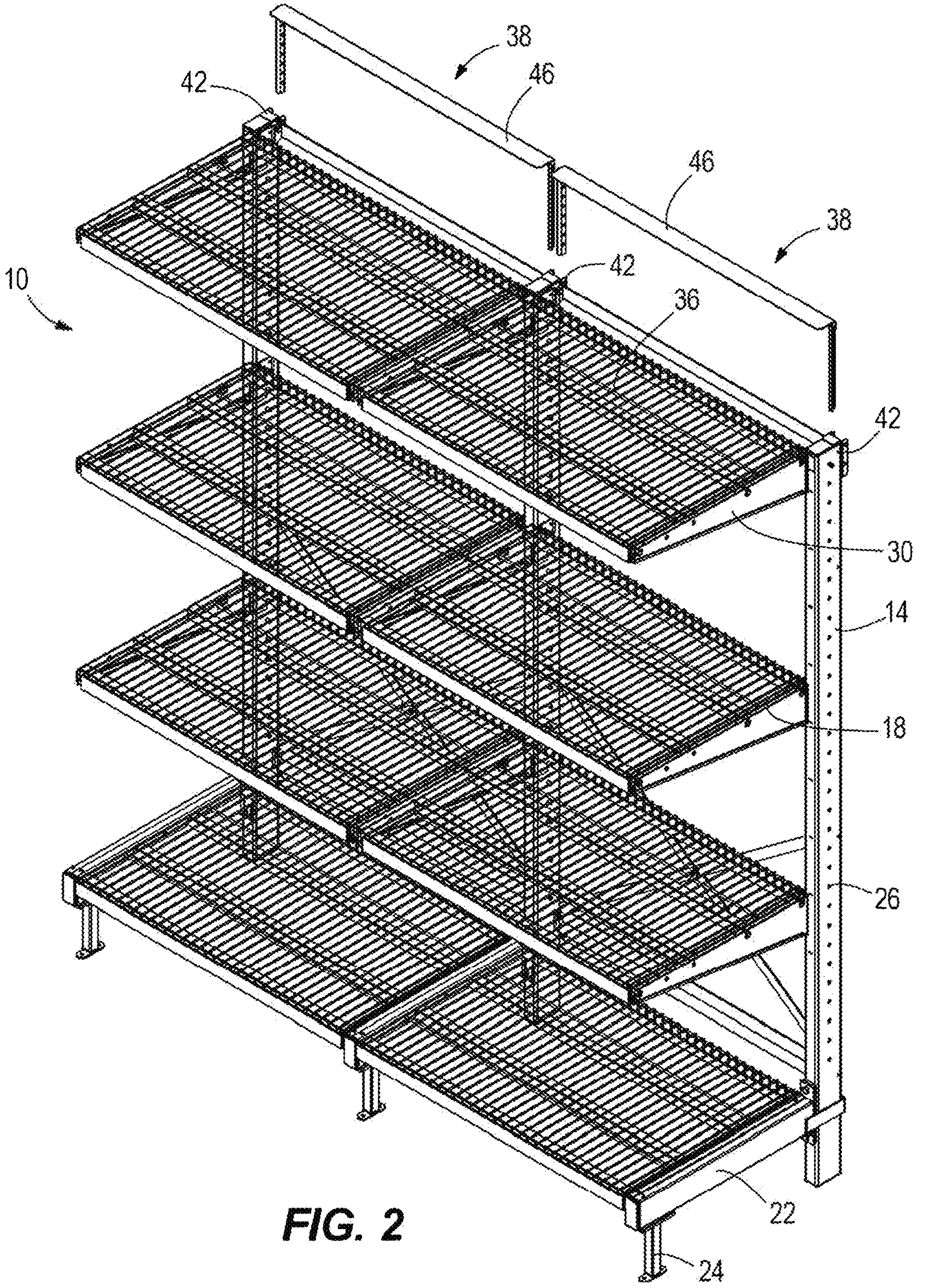
FIG. 2 is a partially exploded perspective view of the modular shelving assembly and sign holder of FIG. 1.

Referring to FIGS. 1 and 2, a modular shelving assembly 10 includes a plurality of vertical support posts 14 and one or more shelves 18. Each shelf 18 includes opposing cantilever bracket members 30 and a support surface such as a wire-frame grid 34 with supporting cross members 36 extending therebetween. A bottom shelf 22 may be differently structured and include support legs 24 for stability of the assembly 10. A cross member or elongated member 40 extends between adjacent support posts 14 rearwardly of certain shelves 18. The modular shelving assembly 10 is described in more detail in U.S. Pat. No. 7,494,019, the entire contents of which are hereby incorporated by reference.

The modular shelving assembly 10 includes a sign holder 38 at the ends of the vertical support posts 14 opposite the bottom shelf 22. Each sign holder 38 includes a plurality of support brackets 42 and at least one height adjustable shelf 46.

Figure 3:
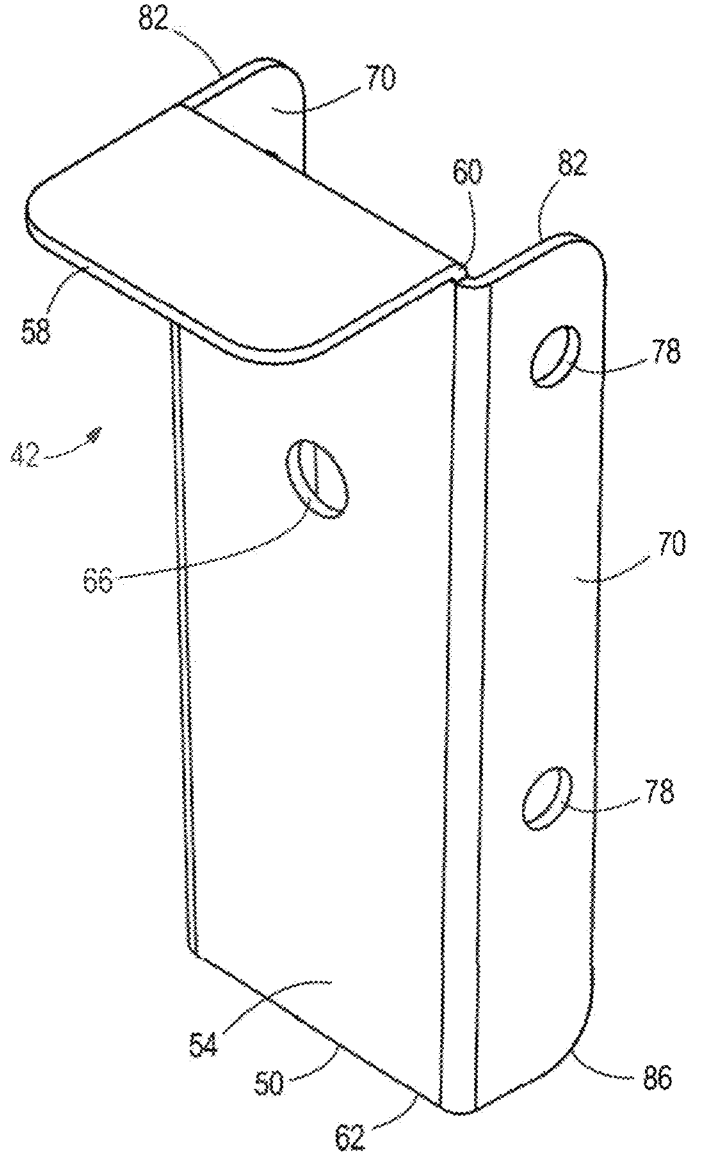
FIG. 3 is a perspective view of a bracket of the sign holder of FIG. 1.

Referring to FIG. 3, the bracket 42 includes a body 50 having a main portion 54 from which extend a tab 58 and flanges 70. The tab 58 is integrally formed with or otherwise coupled to the main portion 54 at a first end 60 and bent at a generally 90-degree angle with respect thereto. Opposing flanges 70 are integrally formed with or otherwise coupled to the main portion 54 from the first end 60 to a second end 62 and bent at a generally 90-degree angle with respect thereto. In other embodiments, the flanges 70 need not extend the entire length of the main portion 54. The tab 58 and flanges 70 extend in opposite directions relative to the main portion 54 and are also oriented 90 degrees from each other; the main portion 54 and the tab 58 form a generally "L" shape and the main portion 54 and the flanges 70 form a generally "U" shape.

The main portion 54 includes an opening 66 for mounting to the support post 14 of the modular shelving assembly 10, as described in greater detail below. Each flange 70 includes two holes 78 for coupling to the height adjustable shelf 46, also as explained in greater detail below. One of the holes 78 is positioned nearer a first end 82 of the flange 70 and the other hole 78 is positioned nearer a second end 86 of the flange 70.

Figure 4:
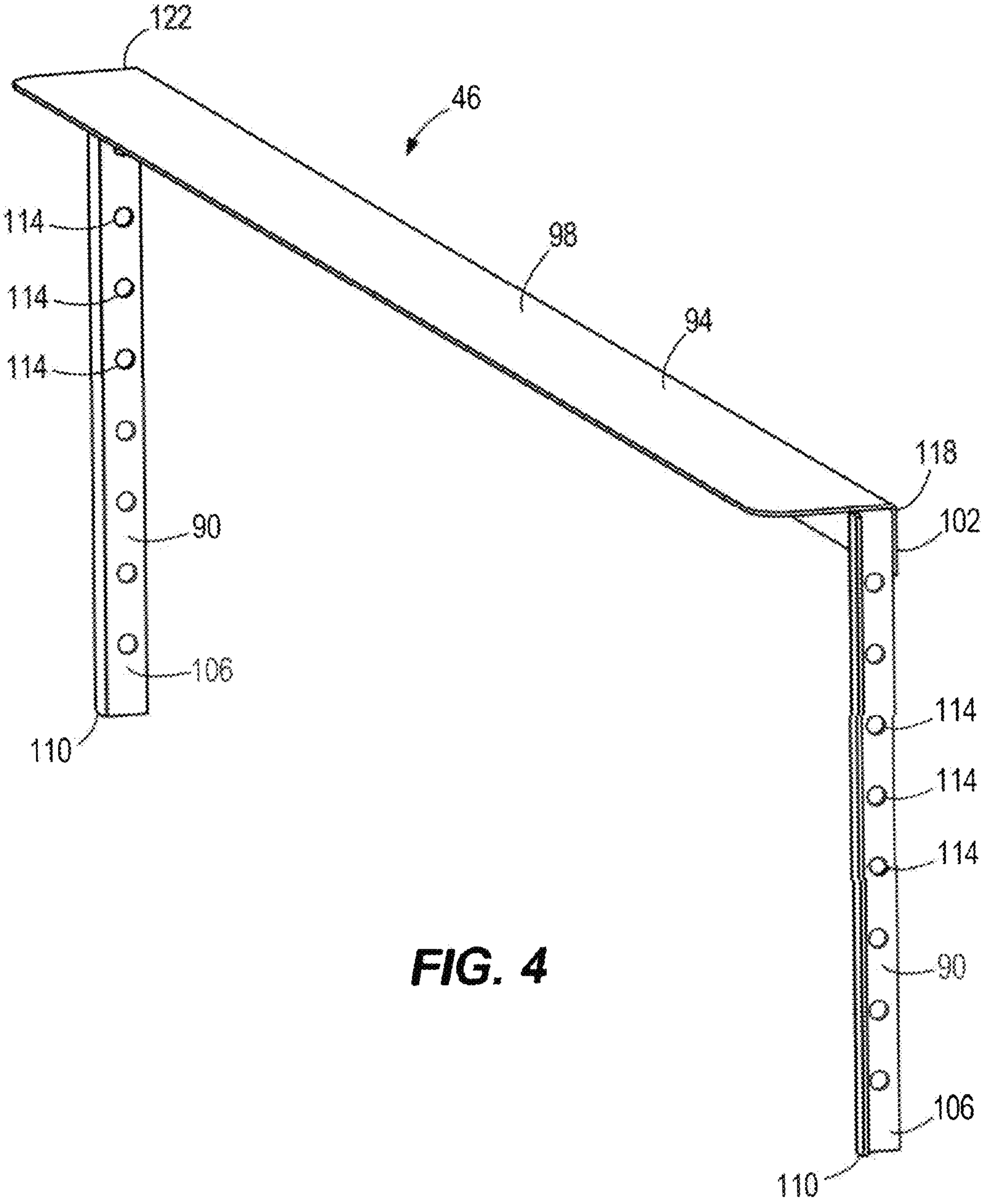
FIG. 4 is a perspective view of a height adjustable shelf of the sign holder of FIG. 1.

Referring to FIG. 4, the height adjustable shelf 46 includes two legs 90 and a supporting shelf or ledge 94. The supporting ledge 94 is L-shaped and includes a support section 98 and an overhang 102 (see also FIG. 5), which projects from the support section 98 at a 90-degree angle thereto. Each leg 90 is also L-shaped and includes an attachment section 106 and a positioning section 110. The attachment section 106 includes a plurality of mounting apertures 114 for attaching the height adjustable shelf 46 to the bracket 42, as described in greater detail below. The two legs 90 are coupled (e.g., fastened, welded, etc.) to the overhang 102 at opposite ends 118, 122 of the supporting ledge 94. Specifically, the longitudinal edge of the attachment section 106 opposite the positioning section 110 is welded or affixed to the inner surface of the overhang 102. In other embodiments, the legs 90 may be secured to the supporting ledge 94 in other ways.

Figure 5:
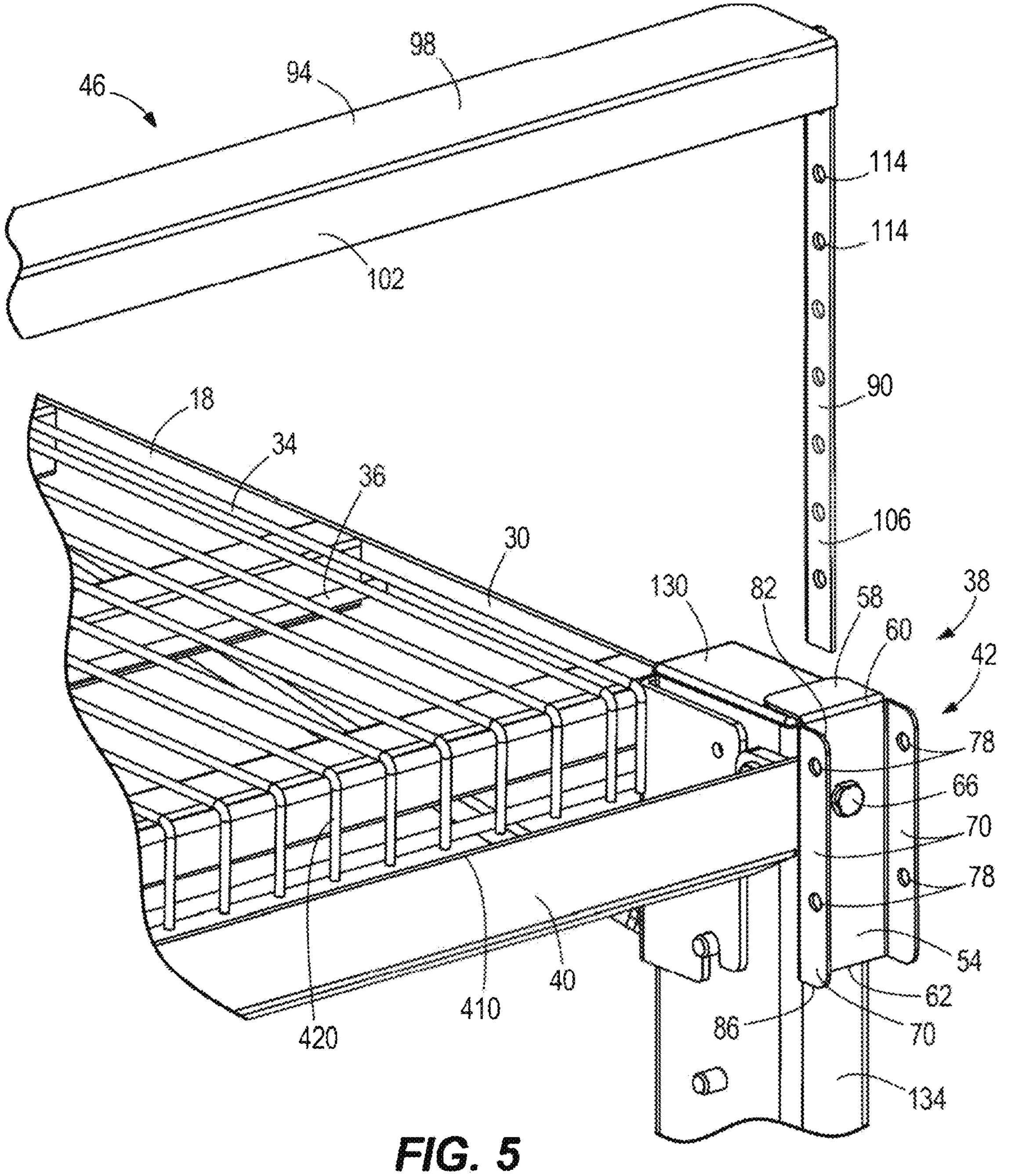
FIG. 5 is a partially exploded partial perspective view of a portion of the modular shelving assembly and sign holder of FIG. 1

Referring to FIG. 5, in assembly, the brackets 42 are attached to respective posts 14 via a fastener (not illustrated) that is inserted through the opening 66 of the main portion 54 of the bracket 42 and into an upper post surface 134 of the support post 14 facing away from the assembled shelves 18. When coupled, the tab 58 abuts a top surface 130 of the support post 14 (which may be a cap or covering made from plastic, rubber, or other suitable material) and the main portion 54 abuts the upper post surface 134. The flanges 70 extend away from the vertical surface 134 when the bracket 42 is so positioned.

Figure 6:
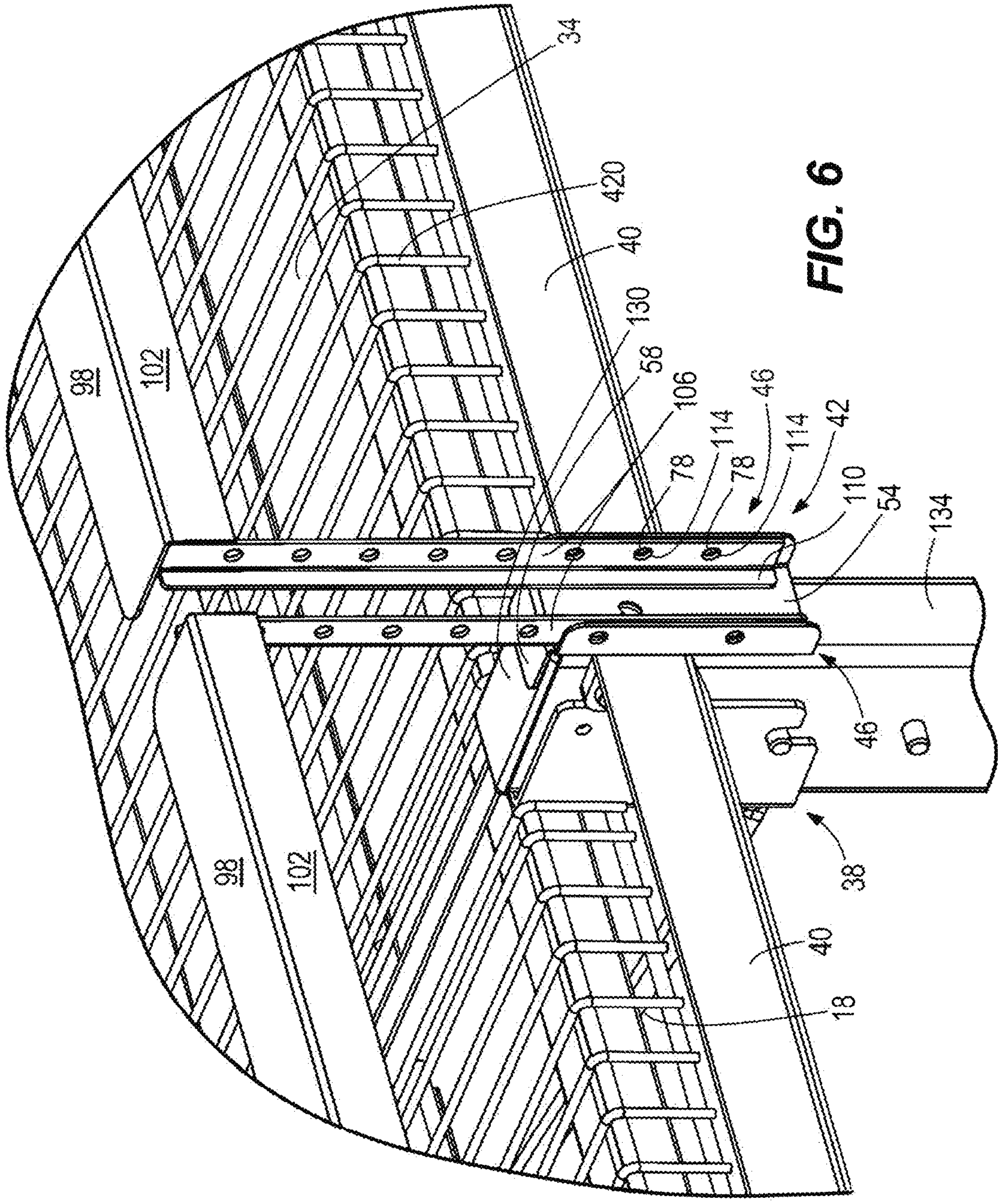
FIG. 6 is a partial perspective view of a portion of the modular shelving assembly and sign holder of FIG. 1 with the height adjustable shelf in a first position.
Figure 7:
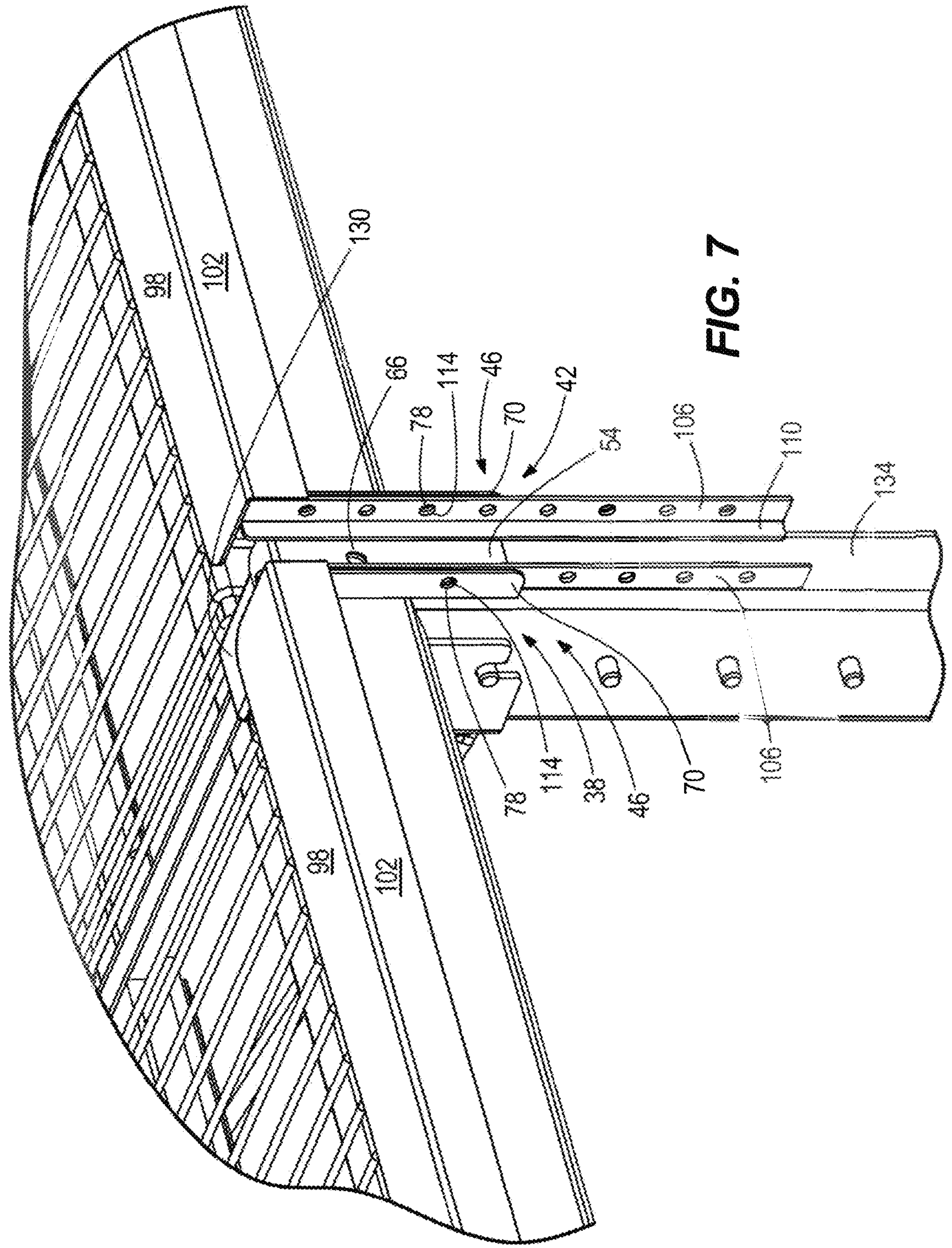
FIG. 7 is a partial perspective view of a portion of the modular shelving assembly and sign holder of FIG. 1 with the height adjustable shelf in a second position.

As illustrated in FIGS. 6 and 7, each leg 90 of a height adjustable shelf 46 is positioned between the flanges 70 of an associated assembled bracket 42, i.e., each bracket 42 is configured to couple thereto one leg of two adjacent shelves 46. The attachment section 106 of each leg 90 is positioned against a respective flange 70 such that the two holes 78 are aligned with two respective mounting apertures 114 of each leg 90. Fasteners (not illustrated) are inserted through the holes 78 and the aligned mounting apertures 114 to fasten the height adjustable shelf 46 to the bracket 42 at one position. When the height adjustable shelf 46 is fastened to the bracket 42, the positioning section 110 abuts the main portion 54 of the bracket 42 and the support section 98 is generally parallel to the assembled grids 34 (or other shelf surface) of the shelves 18. In some embodiments the positioning section 110 is not included.

As illustrated in FIGS. 6 and 7, the height adjustable shelf 46 is adjustable in a number of different positions relative to the bracket 42 or post(s) 14 such that the distance between the top surface 130 and the support section 98 of the supporting ledge 94 is variable. Adjustment is accomplished by unfastening the legs 90 from the associated flange 70, repositioning the legs 90 relative thereto until alignment between holes 78 and apertures 114 is obtained at the new desired relative position, and refastening the legs 90 to the associated flange 70. As illustrated in FIG. 7, the height adjustable shelf 46 may be fastened to the bracket 42 such that the support section 98 is resting upon (or is at least very close to) the top surface 130.

As illustrated in FIGS. 6 and 7, two legs 90 of two different height adjustable shelves 46 may couple to the two flanges 70 of one of the brackets 42 such that two height adjustable shelves 46 may be used with only three brackets 42, as illustrated in FIG. 1.

In one embodiment, the supporting ledge 94 is formed of magnetic material so that a magnetic object (e.g., a display sign; not illustrated) may be held and supported on the support section 98 of the supporting ledge 94. In another embodiment, the support section 98 and/or the overhang 102 may include a plurality of holes (not shown) or other fastener arrangement such that an object (e.g., a display sign; not illustrated) may be fastened (e.g., zip-tied) to the height adjustable shelf 46. Objects may be secured to either the upper or lower surface of the support section 98.

Figure 8:
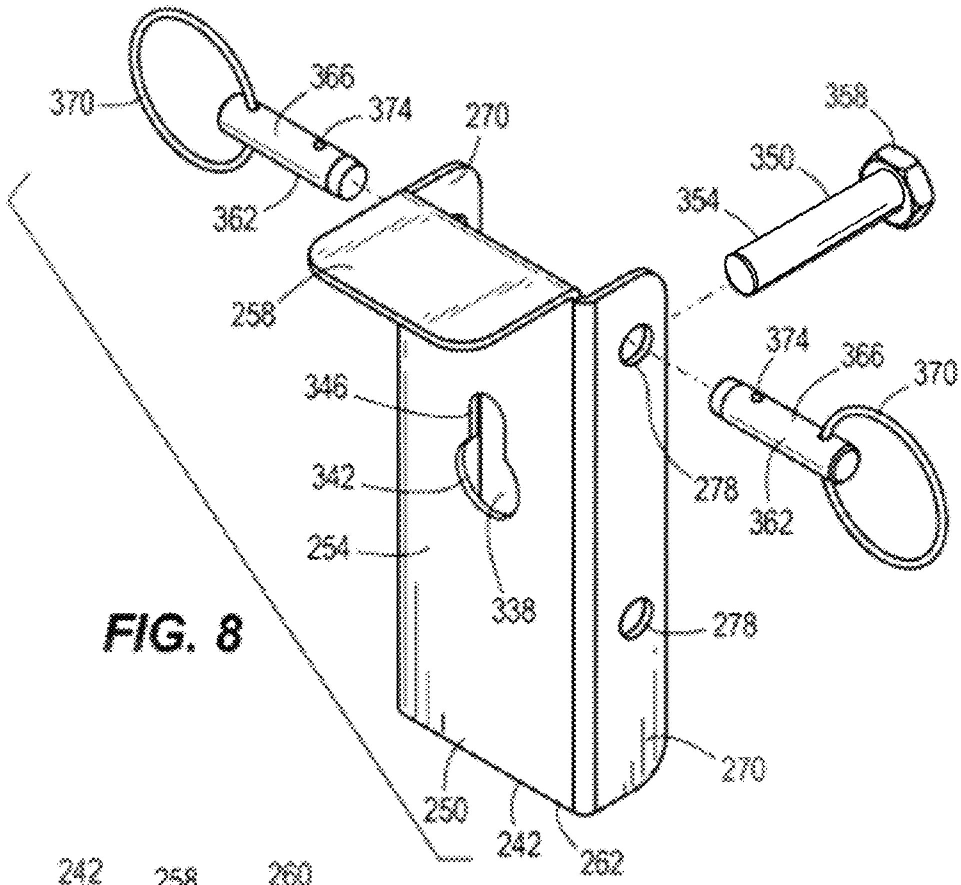
FIG. 8 is an exploded perspective view of a second embodiment of a bracket, a fastener, and two pull pins of the sign holder of FIG. 1.
Figure 9:
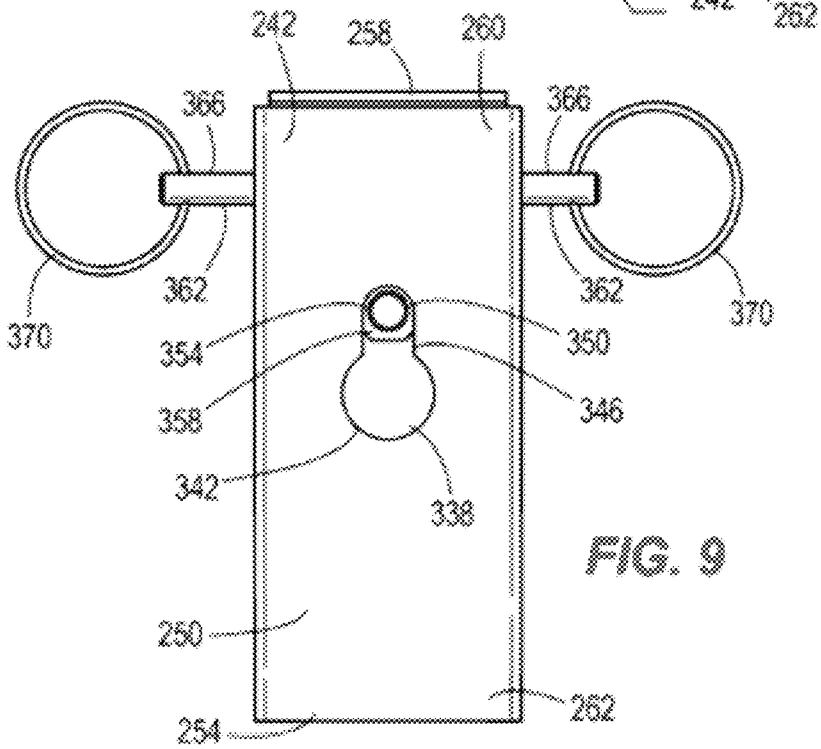
FIG. 9 is a front view of the bracket, fastener, and two pull pins of FIG. 8.
Figure 10:
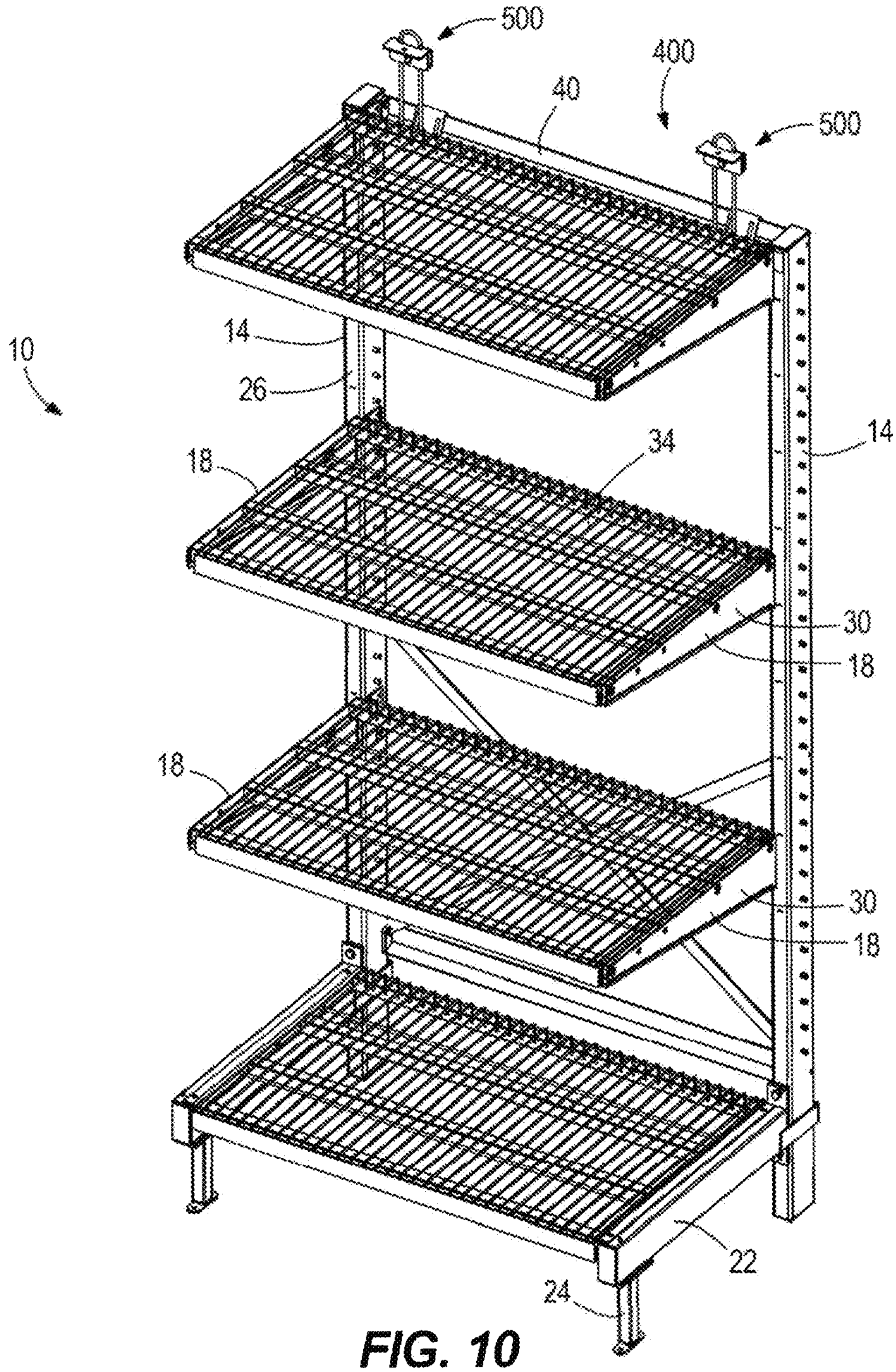
FIG. 10 is a perspective view of a modular shelving assembly including a sign holder according to another embodiment.

FIGS. 8 and 9 illustrate a second embodiment of a support bracket 242 that may be used in the sign holder 38 for the modular shelf assembly 10. The support bracket 242 is similar to the support bracket 42 of the first embodiment and therefore only differences will be described herein. The elements of the support bracket 242 that are similar to those of the support bracket 42 are labeled as the same number plus 200.

The support bracket 242 includes an opening 338 in the main portion 254 of the body 250 for mounting to the support post 14 of the modular support housing 10. The opening 338 includes a circular hole portion or section 342 and a hole extension 346 that extends toward the first end 260 from and is continuous with the hole section 342 such that the opening 338 is shaped like a keyhole. The circular hole section 342 may have a larger diameter than the diameter of all of a fastener 350 to allow for easier mounting of the support bracket 242 to the support post 14 during assembly. The diameter of the hole extension 346 is larger than the diameter of an inserted fastener section 354 but smaller than the diameter of a head 358 of the fastener 350.

To assemble the bracket 242 to the support post 14, an operator first inserts a fastener 350 into the upper post surface 134. The fastener 350 is not fully tightened such that a section of the inserted fastener section 354 extends outside the support post 14. The bracket 242 is moved into position on the upper post surface 134, specifically, the hole section 342 is positioned about or over the extended fastener section 354, and the bracket 242 lowered (with respect to FIG. 9) such that the inserted fastener section 354 is within the hole extension 346 and the bracket 242 is resting upon the fastener section 354. As similarly described above, the tab 258 abuts the top surface 130 of the support post 14. The fastener 350 is then tightened to fasten the bracket 242 to the support post 14 (as similarly shown in FIGS. 5 and 6).

As similarly described above, one leg 90 of a respective height adjustable shelf 46 may be coupled to a flange 270 of the support bracket 242. A pull pin 362 removably couples the leg 90 to the flange 270. Each pull pin 362 includes an insertion portion 366, which is inserted through a hole 278 of the flange 270 and the aligned mounting aperture 114 of the leg 90, and a round grasp 370, which allows an operator to easily remove the pull pin 362. The round grasp 370 is larger than the insertion portion 366 such that it acts as a stop and prevents the pull pin 362 from slipping out of the hole 278 and mounting aperture 114 in a first axial direction. The pull pin 362 is also a form of detent pin with a movable ball 374 biased outward toward the position illustrated in FIG. 8. When the insertion portion 366 is inserted into the hole 278 and the mounting aperture 114, the flange 270 and the leg 90 each force the ball 374 inward into the insertion portion 366. When the pull pin 362 is fully inserted, as illustrated in FIG. 9, the ball 374 is urged into its extended position and acts as a stop and hinders the pull pin 362 from slipping out of the hole 278 and the mounting aperture 114 in a second axial direction opposite the first axial direction. The fasteners 350 and pull pins 362 are equally usable with the above-described first embodiment.

Referring to FIGS. 10-15, in another embodiment, the modular shelving assembly 10 includes a sign holder assembly or bracket assembly 400 including one or more support brackets 500.

Figure 11:
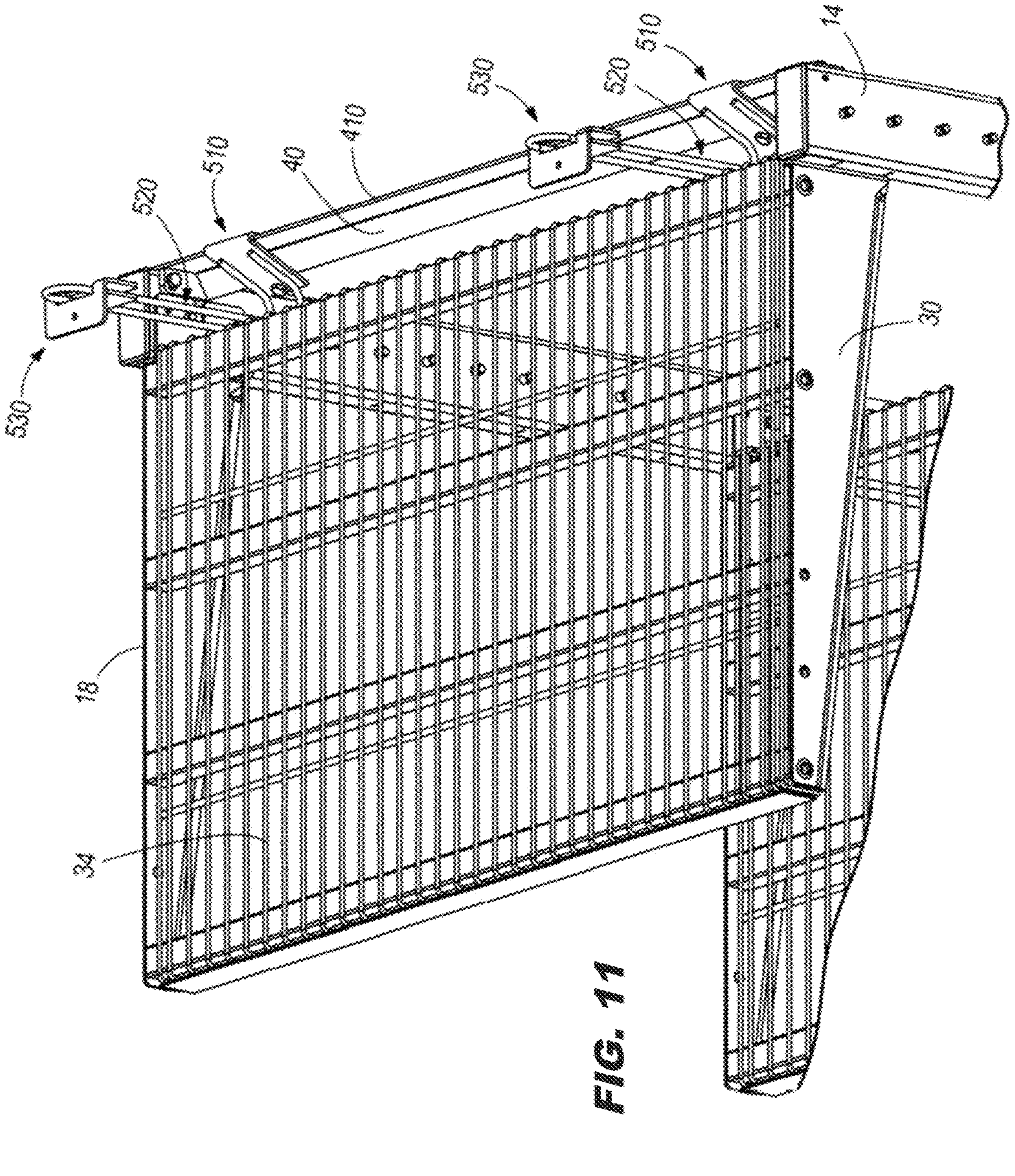
FIG. 11 is a partial perspective view of the modular shelving unit of FIG. 10.

Referring also to FIG. 11, each support bracket 500 includes a base member or support portion 510, an extension portion 520 coupled to the support portion 510, and a securement member or holder or lip 530 removably affixed to the extension portion 520.

Figure 12:
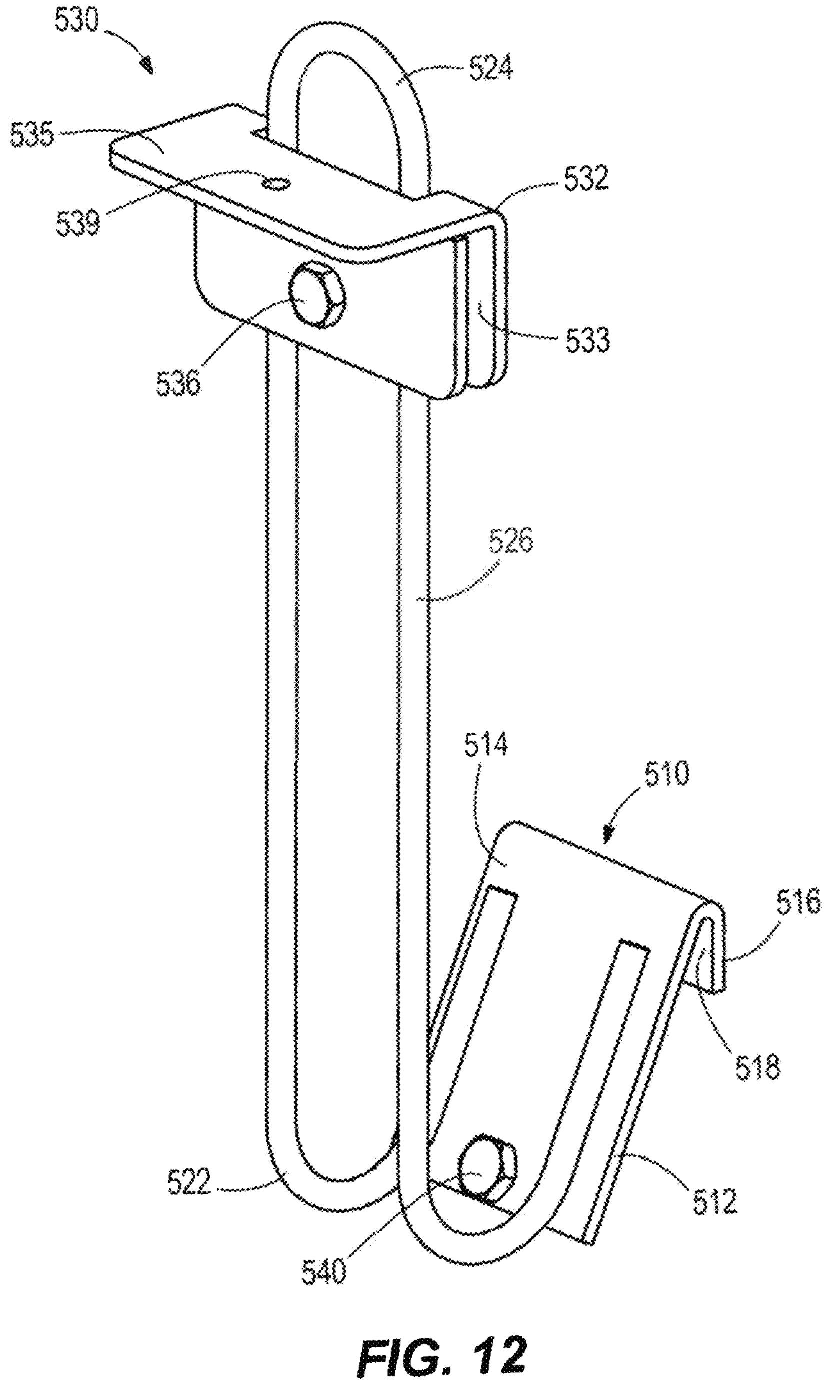
FIG. 12 is a perspective view of a bracket of the sign holder of FIG. 10.
Figure 13:
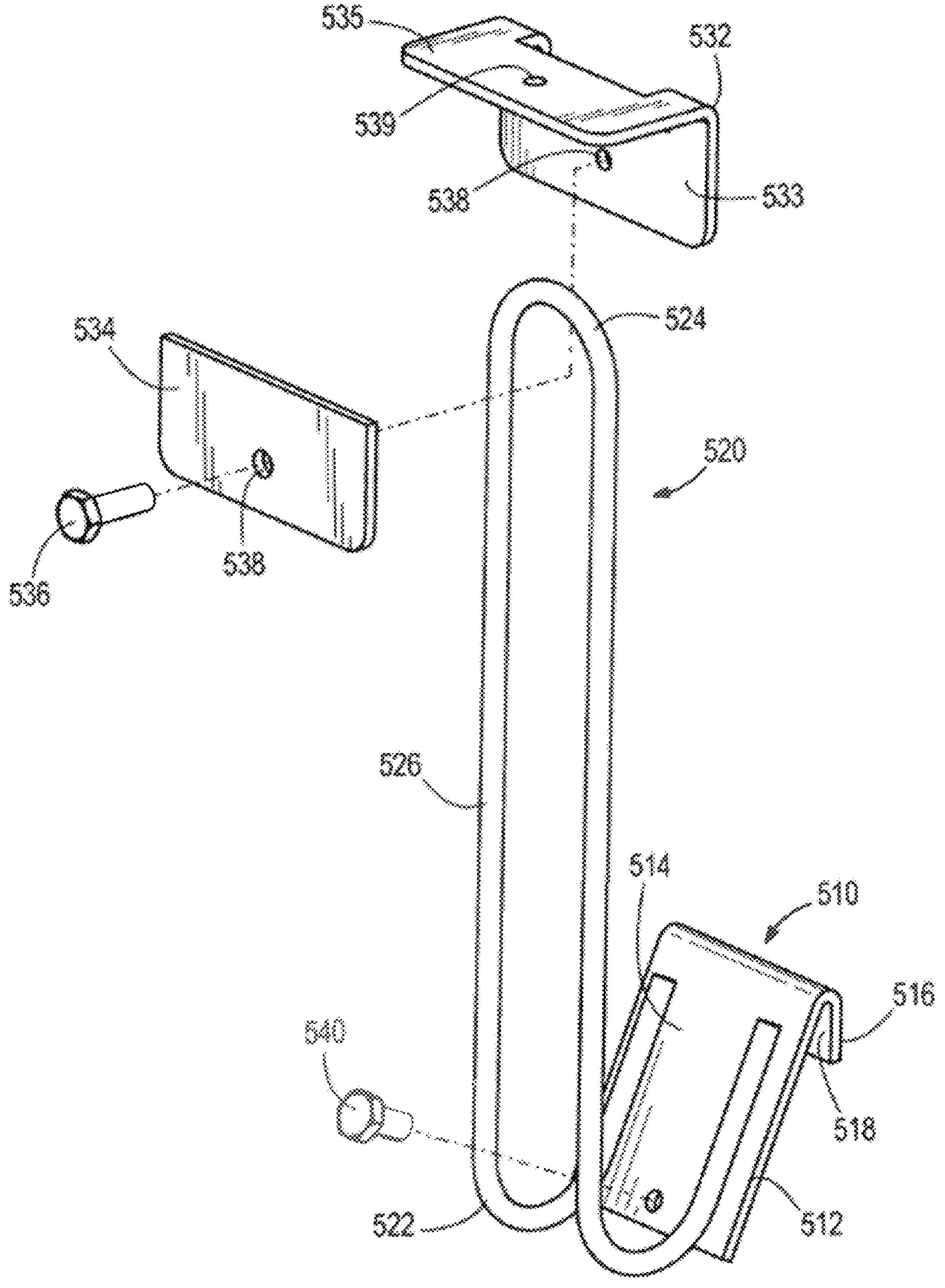
FIG. 13 is a partial exploded view of the bracket of FIG. 12.
Figure 14:
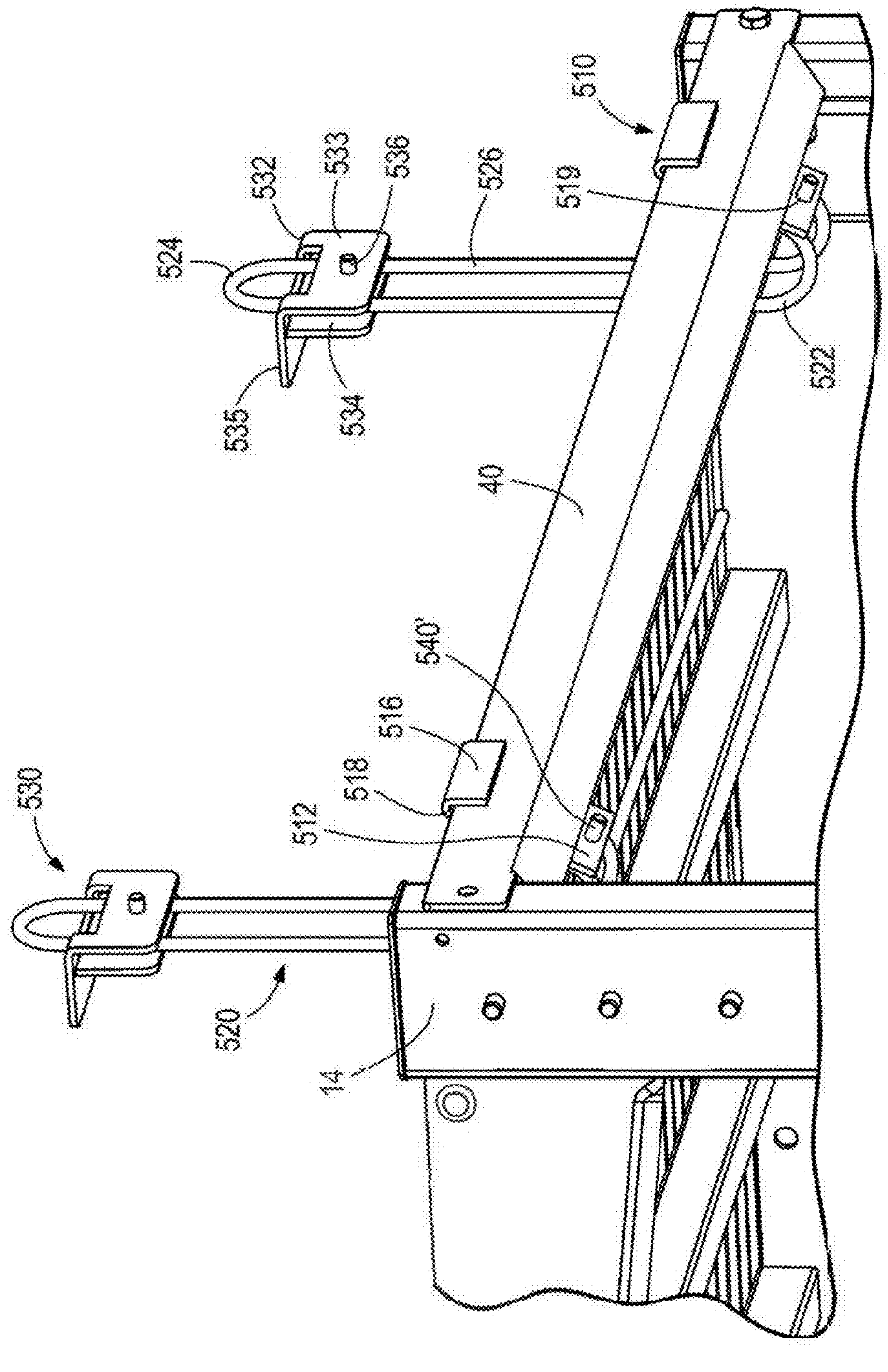
FIG. 14 is another partial perspective view of the modular shelving unit of FIG. 10.
Figure 15:
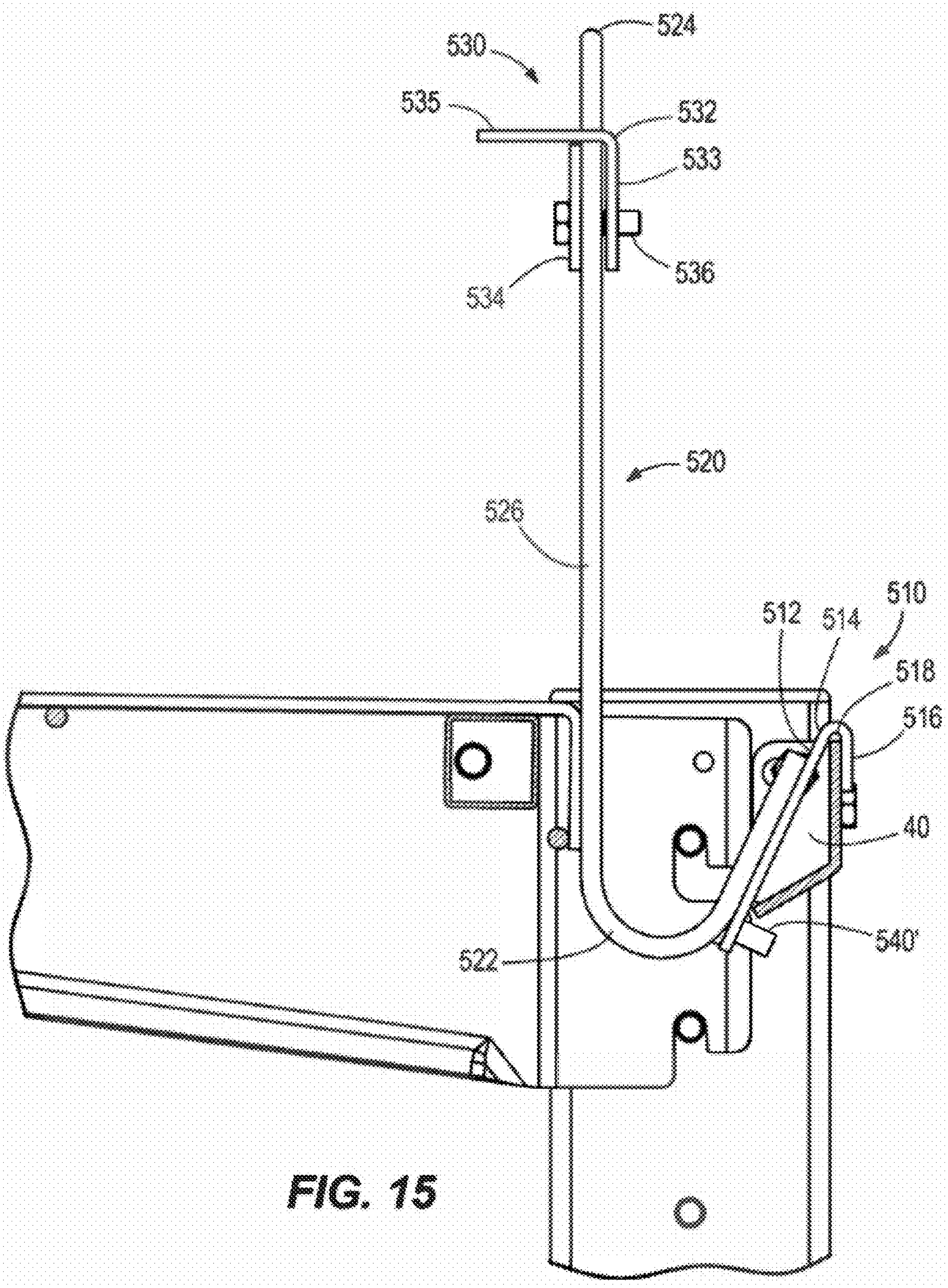
FIG. 15 is a partial side view of the modular shelving unit of FIG. 10.

Referring to FIG. 12, the support portion 510 may be in the form of a nonlinear or curved or hooked plate and specifically includes a body 512 presenting a flat or planar surface 514 from which extends an angled section or catch 516. The catch 516 is generally curvilinear such as to form a recess 518. An aperture 519 (FIG. 14) through the body 512 is configured to receive a fastener 540, which when assembled creates protrusion 540' as shown in FIGS. 14-15 and further detailed below.

The extension portion 520 projects from the body 512 and includes a first or lower section 522 and a second or upper section 524. The lower section 522 is rigidly coupled to the support portion 510, but in other embodiments the lower section 522 may be removably couplable to the support portion 510. In FIGS. 10-15 the lower section 522 is illustrated as two parallel U- or J-shaped legs transitioning to parallel leg, rods, or wires of a middle section 526, the rods or wires thereafter arcuately joining together to form the upper section 524. The above-referenced sections of the extension portion 520, however, need not be in the form of rods, wires, etc., but can alternatively be, for example, a structure such as a notched beam, or a beam or plate with a series of holes, tabs, catches, etc.

The securement member 530 includes an L-shaped display support or member 532 and an adjustment plate 534. The L-shaped member 532 includes a first leg 533 and a second leg or ledge 535 that extends orthogonally from the first leg 533. The adjustment plate 534 and the first leg 533 both include fastening holes 538 (FIG. 13) configured to align and thereafter receive a fastener 536. In one embodiment of the sign holder assembly 400, the second leg 535 is formed of magnetic material (similar to the supporting ledge 94) so that a magnetic object (e.g., a display sign or reference, not illustrated) may be held and supported on or under the leg 535. In another embodiment the first leg 533, the second leg 535, or the adjustment plate 534 may include a plurality of holes or other fastener arrangement, a through hole 539 located on the second leg 535 being an example, such that an object (e.g., a display sign, not illustrated) may be fastened (e.g., ziptied) to the securement member 530.

In assembly of a bracket 500 to the modular shelving assembly 10, the support portion 510, and in particular the catch 516, is positioned on a top edge 410 of the cross member 40 at a desired location along its length such that the top edge 410 is received within the recess 518. So positioned, the middle section 526 contacts or abuts the rear of the assembled shelf 420, as shown in FIG. 15. Fastener 540 is at least partially passed through aperture 519 to form the protrusion 540', which cooperates with the catch 516 to constrain movement of the support portion 510 about the cross member 40. In other embodiments, fastener 540 could fixedly couple the catch portion 510 directly to the cross member 40 through a receiving hole therein.

The securement member 530 is adjustable to a plurality of positions along the middle and upper sections 526, 524. To adjust, the fastener 536 is released, leaving the securement member 530 free to slide along the extension portion 520 or to be removed entirely. The fastener 536 then re-secures the display support 532 to the adjustment plate 534, sandwiching the extension portion 520 therebetween and fixing the height of the display support 532 relative to the cross member 40. Display signs or references or similar objects may then be secured to an upper or lower surface of the second leg 535 for display, as previously described for supporting ledge 94.

In some applications, a single support bracket 500 may be utilized to support a display reference, two or more support brackets 500 may be positioned cooperatively along a cross member 40 to support a display reference, or a plurality of support brackets 500 may be positioned along a cross member to support a plurality of display references.

Thus, the disclosure provides, among other things, embodiments of a height adjustable sign holder for a shelving assembly or shelving system. While the above describes example embodiments of the present disclosure, these descriptions should not be viewed in a limiting sense. Rather, several variations and modifications may be made without departing from the scope of the present disclosure.

Various features of the disclosure are set forth in the following claims.

What is claimed is:

1. A support bracket comprising:
a support portion comprising:
  a planar body;
  an angled section extending from an end of the planar body, forming a catch;
an extension portion comprising:
  a lower section coupled to the planar body;
  a middle section extending from the lower section;
  an upper section extending from the middle section; and
a securement member removably affixed to the extension portion, the securement member comprising:
  an adjustment plate comprising one or more fastener holes;
  an L-shaped member comprising:
    a first leg comprising one or more fastener holes;
    a second leg extending orthogonally from the first leg, forming an edge;

a recess provided about the edge and extending into the first leg and the second leg, wherein the recess receives the extension portion therethrough;

one or more fasteners securing the L-shaped member and the adjustment plate together through the one or more fastener holes of the first leg and the adjustment plate; and wherein the adjustment plate and the L-shaped member are structurally distinct components.

2. The support bracket of claim 1, wherein the support portion further comprises an aperture provided at the end of the planar body opposite the angled section.

3. The support bracket of claim 2, wherein support portion further comprises a fastener provided through the aperture, forming a protrusion.

4. The support bracket of claim 1, wherein the lower section is rigidly coupled to the planar body.

5. The support bracket of claim 1, wherein the lower section is removably coupled to the planar body.

6. The support bracket of claim 1, wherein the extension portion comprises two parallel rods.

7. The support bracket of claim 6, wherein the two parallel rods arcuately join together in the upper section.

8. The support bracket of claim 1, wherein the extension portion comprises a notched beam.

9. The support bracket of claim 1, wherein the extension portion comprises a beam comprising a plurality of holes.

10. The support bracket of claim 9, wherein at least one of the one or more fasteners passes through a hole in the beam.

11. The support bracket of claim 1, wherein the one or more fastener holes of the first leg and the adjustment plate align, such that adjustment plate abuts the second leg when the L-shaped member and the adjustment plate are secured together.

12. The support bracket of claim 1, wherein the one or more fastener holes of the first leg and the adjustment plate align, such that no portion of adjustment plate extends beyond any edge of the L-shaped member when the L-shaped member and the adjustment plate are secured together.

13. The support bracket of claim 1, wherein the one or more fastener holes of the first leg and the adjustment plate align, such that adjustment plate abuts the second leg and no portion of adjustment plate extends beyond any edge of the L-shaped member when the L-shaped member and the adjustment plate are secured together.

14. The support bracket of claim 1, wherein the second leg comprises a magnetic material.

15. The support bracket of claim 1, wherein the second leg further comprises one or more through-holes.

* * * * *